(12) United States Patent
Robinson et al.

(10) Patent No.: US 11,376,897 B2
(45) Date of Patent: Jul. 5, 2022

(54) ELECTRICAL CONDUCTIVE GUM STRIP

(71) Applicant: Bridgestone Americas Tire Operations, LLC, Nashville, TN (US)

(72) Inventors: Timothy F. Robinson, North Canton, OH (US); Robert W. Asper, Wadsworth, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 427 days.

(21) Appl. No.: 16/311,490

(22) PCT Filed: Jul. 6, 2017

(86) PCT No.: PCT/US2017/040822
§ 371 (c)(1),
(2) Date: Dec. 19, 2018

(87) PCT Pub. No.: WO2018/009605
PCT Pub. Date: Jan. 11, 2018

(65) Prior Publication Data
US 2019/0184770 A1 Jun. 20, 2019

Related U.S. Application Data

(60) Provisional application No. 62/359,280, filed on Jul. 7, 2016.

(51) Int. Cl.
*B60C 19/08* (2006.01)

(52) U.S. Cl.
CPC ............ *B60C 19/08* (2013.01); *B60C 19/086* (2013.01); *B60C 19/088* (2013.01)

(58) Field of Classification Search
CPC ...... B60C 19/08; B60C 19/082; B60C 19/084; B60C 19/086; B60C 19/088
(Continued)

(56) References Cited

U.S. PATENT DOCUMENTS

| 2,339,546 A | 1/1944 | Hanson |
| 5,898,047 A | 4/1999 | Howald et al. |

(Continued)

FOREIGN PATENT DOCUMENTS

| CA | 2209740 A1 | 7/1998 |
| CH | 597008 A5 | 3/1978 |

(Continued)

OTHER PUBLICATIONS

Machine Translation: JP-08230407-A, Matsuo, Toshiaki, (Year: 2021).*

(Continued)

*Primary Examiner* — Kendra Ly
(74) *Attorney, Agent, or Firm* — Shaun J. Fox

(57) ABSTRACT

A pneumatic tire is described as having one or more electrical conductive strips for discharging electrical build up in the tire. The electrical conductive strips provide a static electricity conductive path from the tire rim to a ground-contacting surface. The strips are arranged around the outer surface of the tire from a first bead portion to a second bead portion. The strips can lay over the outer surface of the sidewalls and the tire tread. As positioned over the tire tread, a portion of the electrical conductive strip remains in contact with the ground as the tread wears during use to provide continued dissipation of static electricity away from the tire.

13 Claims, 4 Drawing Sheets

(58) Field of Classification Search
USPC .................................................. 152/152.1
See application file for complete search history.

(56) References Cited

U.S. PATENT DOCUMENTS

| | | | |
|---|---|---|---|
| 8,353,324 | B2 | 1/2013 | Nakamura |
| 8,550,132 | B2 | 10/2013 | Deguchi |
| 8,960,245 | B2 | 2/2015 | Yonetsu |
| 2007/0125466 | A1* | 6/2007 | Nagahara ................. B60C 19/08 |
| | | | 152/152.1 |
| 2008/0295934 | A1 | 12/2008 | Mafune et al. |
| 2010/0132859 | A1 | 6/2010 | Steiner et al. |
| 2010/0326588 | A1 | 12/2010 | Cappa et al. |
| 2012/0048435 | A1* | 3/2012 | Kuroki ................... B29D 30/60 |
| | | | 152/152.1 |
| 2014/0174612 | A1 | 6/2014 | Yoshikawa |
| 2014/0224392 | A1 | 8/2014 | Du et al. |

FOREIGN PATENT DOCUMENTS

| | | | | |
|---|---|---|---|---|
| CN | 201205850 | Y | | 3/2009 |
| DE | 10032857 | A1 | | 3/2001 |
| EP | 0747243 | B1 | | 2/2001 |
| GB | 544757 | A | * | 4/1942 ............. B60C 19/08 |
| JP | 08230407 | A | * | 9/1996 |
| JP | H08230407 | A | | 9/1996 |
| JP | 2004268863 | A | * | 9/2004 |
| JP | 2004277504 | A | | 10/2004 |
| JP | 2008222135 | A | | 9/2008 |

OTHER PUBLICATIONS

Machine Translation: JP-2004268863-A, Tozawa, Yukio, (Year: 2021).*

* cited by examiner

US 11,376,897 B2

ELECTRICAL CONDUCTIVE GUM STRIP

TECHNICAL FIELD

The present disclosure relates to an electrical conductive strip to dissipate static electricity away from a tire, and more particularly, an electrical gum conductive strip that extends around an outer surface of a tire from one bead portion of the tire to the other bead portion of the tire.

BACKGROUND

While in use, friction within pneumatic tires routinely generates static electricity that can build up in the tire over time. Such internal friction is often caused by tire deformation. Pneumatic tires often contain tread components containing silica, which can result in the components having a higher electrical resistance. As a consequence of higher electrical resistance, accumulated electrical energy such as static electricity is not readily discharged from the tire during use. Build-up of static electricity within the tire is disadvantageous and may interfere with electrical components of the vehicle, sparking near combustible materials, or unpleasant shocks to the vehicle's operator.

In order to reduce or eliminate unwanted accumulations of static electricity, tire manufacturers often incorporate conductive materials, which can transfer the charge from the tire to the ground, into tires. However, suitable conductive materials can be expensive to implement and require modifications in tire design and manufacturing equipment. Thus, tire manufacturing time and associated costs can undesirably increase as electrical resistivity countermeasures are implemented in tires.

An objective of the present disclosure is to alleviate or overcome one or more difficulties related to the prior art. It has been found that incorporating electrical strips made of conductive materials around the circumference of a tire, such that the strips are in contact with the rim, sidewalls, and tread portion, can beneficially enhance electrical discharge from the vehicle to the ground. The electrical conductive strips are easily applied to the outer surface of the tire and reduce the need for tire design or equipment modifications. Furthermore, utilizing said electrical conductive strips may decrease the associated costs of tire tread modification and increase the number of manufacturing plants capable of incorporating electrical resistivity countermeasures into tires.

SUMMARY

In a first aspect, there is a pneumatic tire that includes a circumferential tread portion having an outer tread running surface containing tread grooves; a first sidewall and a second sidewall, the first and second sidewalls having an outer surface facing away from a carcass portion; a first bead portion and a second bead portion, the first and second bead portions being connected with the tread portion by at least the first and second sidewalls and the first and second bead portions having a rim contact portion; and, an electrical conductive strip that continuously extends around an outer surface of the pneumatic tire from the first bead portion to the second bead portion, the electrical conductive strip being in contact with the outer surface of the first and second sidewalls, the first and second bead portions and the tread portion.

In an example of aspect 1, the electrical conductive strip is in contact with the outer tread running surface, and the electrical conductive strip is contoured with and in contact with a portion of the tread grooves of the tread portion.

In another example of aspect 1, the electrical conductive strip is in contact with a tire rim, wherein the electrical conductive strip is posited between the tire rim and the first bead portion and the second bead portion.

In another example of aspect 1, the electrical conductive strip is a static electricity conductive path from the tire rim to a ground-contacting surface of the pneumatic tire.

In another example of aspect 1, the pneumatic tire further includes two or more electrical conductive strips, each of the two or more electrical conductive strips continuously extending from the first bead to the second bead, the two or more electrical conductive strips being spaced apart and not in contact with one another.

In another example of aspect 1, the tread grooves form a tread pattern and the electrical conductive strip overlies a portion of the tread pattern, the electrical strip being contoured with and in contact with the portion of the tread pattern.

In another example of aspect 1, the electrical strip has a higher electrical conductivity relative to the electrical conductivity of the first and second sidewalls and the outer tread running surface of the tread portion.

In another example of aspect 1, the electrical conductive strip overlies the outer tread running surface to form a ground-contacting surface.

In another example of aspect 1, the ground-contacting surface of the electrical conductive strip is in direct contact with a ground surface.

In another example of aspect 1, the electrical conductive strip is arranged over the tread portion in a direction perpendicular to the circumferential direction of the tread portion.

In another example of aspect 1, the electrical conductive strip being made up of an electrical conductive strip composition including electrical conductive strip components and the outer tread running surface of the tread portion being made up of a tread composition including tread composition components, wherein the electrical conductive strip components are the same as the tread composition components.

In another example of aspect 1, the electrical conductive strip components include a conductive component and the tread composition includes the same type of conductive component as present in the electrical conductive strip components, wherein the amount of the electrical component in the electrical conductive strip composition is greater than the amount of the electrical component in the tread composition. In an example, the electrical component in the electrical conductive strip composition is 10, 20, 30, 40, 50, 60, 70, 80 or 90 percent greater in concentration as compared to the concentration of the same type of electrical component present in the tread composition.

In another example of aspect 1, the electrical conductive strip has a width in the range of 0.5 to 3 inches.

In another example of aspect 1, the electrical conductive strip has a thickness of less than 0.1 inch.

In another example of aspect 1, the electrical conductive strip has an outermost surface that forms a portion of the outer surface of the first and second sidewalls and a portion of the outer tread running surface.

The first aspect may be provided alone or in combination with any one or more of the examples of the first aspect discussed above.

In a second aspect, the method of making a pneumatic tire, for example the tire of aspect 1, that includes forming an uncured tire, the uncured tire comprising a circumferential tread portion having an outer tread surface, a first sidewall and a second sidewall, the first and second sidewalls arranged axially adjacent to the tread portion, the first and second sidewalls having an outer surface facing away from a carcass portion, and a first bead portion and a second bead portion, the first and second bead portions being connected with the tread portion by at least the first and second sidewalls and the first and second bead portions having a rim contact surface; overlying a flexible uncured rubber electrical conductive gum strip on an outer facing surface of the uncured tire, the uncured rubber electrical strip continuously extending around an outer surface of the uncured tire from the first bead portion to the second bead portion, the uncured rubber electrical conductive strip being in contact with the outer surface of the first and second sidewalls and tread portion; and, curing the uncured tire and uncured rubber electrical conductive strip to form a pneumatic tire.

In an example of aspect 2, the uncured tire and the uncured rubber electrical conductive strip are cured in a tire mold, wherein the tire mold forms an outer tread running surface contains tread grooves, and the uncured rubber electrical conductive strip is contoured with and in contact with a portion of the tread grooves.

In another example of aspect 2, the method further includes overlaying two or more uncured rubber electrical conductive strips on an outer facing surface of the uncured tire, each of the two or more uncured rubber electrical conductive strips continuously extending from the first bead portion to the second bead portion, the two or more uncured rubber electrical conductive strips being spaced apart and not in contact with one another.

In another example of aspect 2, the cured rubber electrical conductive strip overlies the outer tread running surface of the tread portion to form a ground contacting surface for the pneumatic tire.

In another example of aspect 2, the cured rubber electrical conductive strip has an outermost surface that forms a portion of the outer surface of the first and second sidewalls of the pneumatic tire.

In another example of aspect 2, the cured rubber electrical conductive strip overlies a portion of the rim contact portion of each of the first and second bead portions.

In another example of aspect 2, the cured rubber electrical conductive strip forms a portion of a tread pattern of the pneumatic tire, wherein the cured rubber electrical conductive strip has a ground contacting surface in the portion of the tread pattern.

The second aspect may be provided alone or in combination with any one or more of the examples of the first or second aspects discussed above.

The accompanying drawings are included to provide a further understanding of principles of the invention, and are incorporated in and constitute a part of this specification. The drawings illustrate one or more embodiment(s), and together with the description serve to explain, by way of example, principles and operation of the invention. It is to be understood that various features disclosed in this specification and in the drawings can be used in any and all combinations. By way of non-limiting example the various features may be combined with one another as set forth in the specification as aspects.

BRIEF DESCRIPTION OF THE DRAWINGS

The above description and other features, aspects and advantages are better understood when the following detailed description is read with reference to the accompanying drawings, in which.

DETAILED DESCRIPTION

The terminology as set forth herein is for description of the embodiments only and should not be construed as limiting the invention as a whole.

Herein, when a range such as 5-25 (or 5 to 25) is given, this means preferably at least or more than 5 and, separately and independently, preferably not more than or less than 25. In an example, such a range defines independently at least 5, and separately and independently, not more than 25.

The term "phr" means parts per hundred parts of rubber by weight, and is a measure common in the art wherein components of a composition (e.g., sealant material) are measured relative to the total of all of the elastomer (rubber) components. The total phr or parts for all rubber components, whether one, two, three, or more different rubber components are present in a rubber composition are defined as 100 phr. Other non-rubber components are generally proportional to the 100 parts of rubber and the relative amounts may be expressed in phr.

The present disclosure relates to a pneumatic tire having an electrical conductive strip that continuously extends around and thereby forms a portion of the outer surface of a tire, for example, in a continuous and uninterrupted manner from one bead portion to a second bead portion or from a first rim contact portion to a second rim contact portion. The outer tread running surface can have the electrical conductive strip contoured and in contact with and overlaying the individual treads such that it forms a ground-contacting surface that can wear with the tread during use to provide a constant contact surface with the ground.

As the tire rotates, built-up static electricity, which is generated from internal friction within the tire or transferred from the vehicle, can be discharged from the tire and vehicle to the road surface through the electrical conductive strip. Additionally, the present disclosure provides a method that may be used to make a pneumatic tire having an electrical conductive strip. An uncured tire may have an uncured rubber electrical conductive strip applied to its surface such that the strip continuously extends from one bead portion to a second bead portion. In attaching this way, the uncured rubber electrical conductive strip can be easily applied to an already assembled tire such that is overlays the sidewalls and the outer-tread running surface of the uncured tire. The uncured tire and overlay uncured rubber electrical conductive strip can then be simultaneously cured to form a pneumatic tire. Because the electrical conductive strip or strips can be applied an assembled tire as an overlay, existing manufacturing equipment and methods do not require modification, which can result in production time and cost savings.

Figure 1:
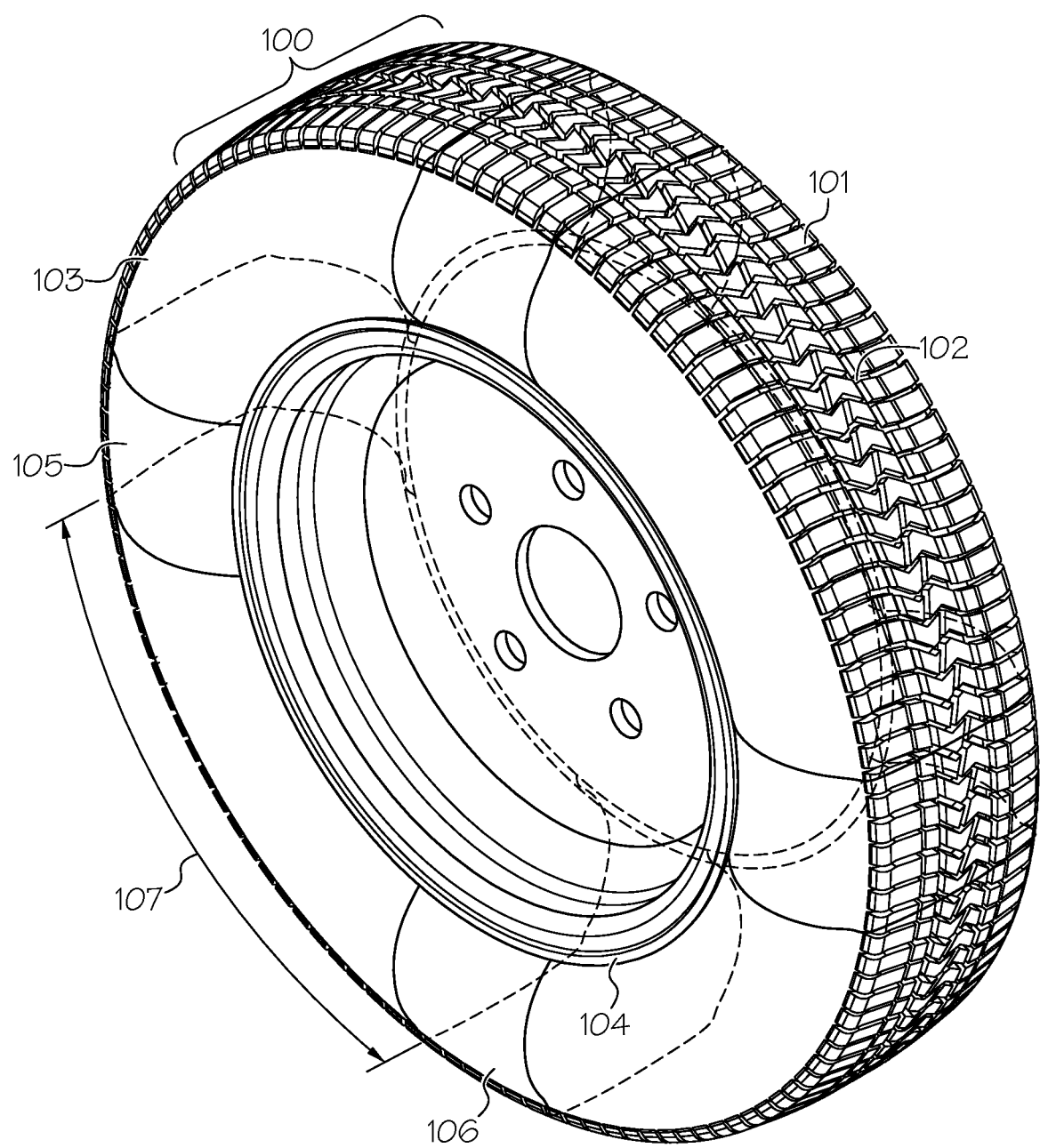
FIG. 1 shows one embodiment of a pneumatic tire containing multiple electrical conductive strips described herein.
Figure 2:
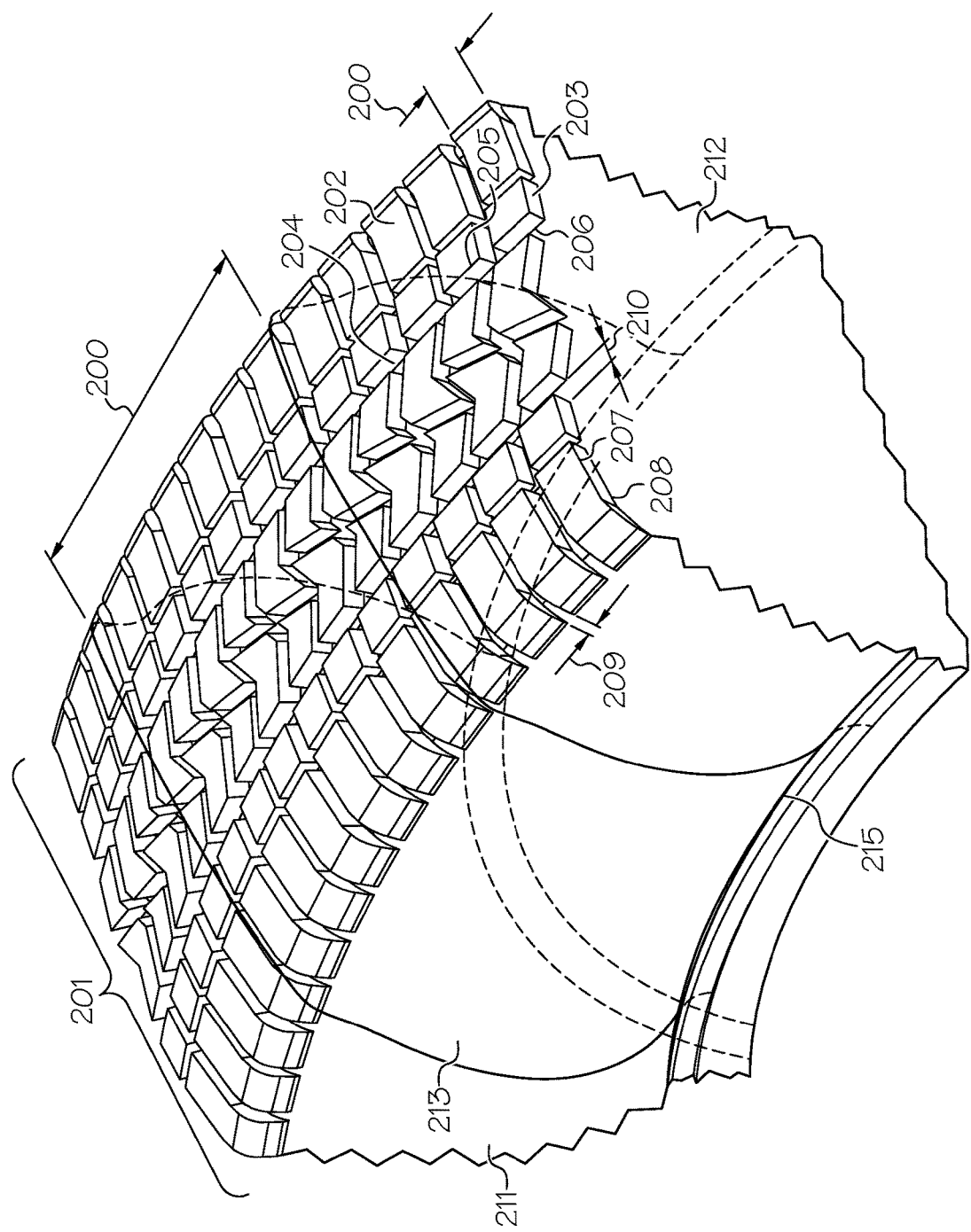
FIG. 2 shows an enhanced view of one embodiment of individual treads and an electrical conductive strip on the tread of a pneumatic tire described herein.

An example of a pneumatic tire according to the present disclosure is shown in FIGS. 1 and 2. The tire can be any vehicle or transport tire, such as radial passenger, truck or semi tire, and can be constructed in a manner conventional in the art. The tire can also include those used for twowheeled vehicles (e.g., motorcycles), aircraft (e.g., plane, helicopter), industrial vehicles (e.g., vans), heavy vehicles, buses, road transport machinery (e.g., tractors, trailers), off-road vehicles, agricultural machinery or construction machinery, and other transport or handling vehicles.

FIG. 1 illustrates a pneumatic tire having a circumferential tread portion 100 having an outer tread running surface 101. The outer tread running surface 101 is the outermost surface of the tread and is the portion of the tread that contact the ground during operation. The outer tread running surface 101 of the circumferential tread portion 100 also contains tread grooves 102. The tread grooves 102 are adjacent to the outer tread running surface 101 and extend inward towards the center of the tire to form indentations. The grooves extend radially inward (or have a depth) from the outer tread running surface 101 to a base portion within the tread portion 100. A tread groove can typically have a depth of 3/16 of an inch.

A first sidewall 103 and a second sidewall are arranged axially adjacent to each side of the circumferential tread portion 100. Each sidewall contains an outer surface facing outward from the interior of the tire, for example, away from the carcass or inner liner (not shown). As known in the art, the tire carcass and inner liner are positioned underneath the sidewalls and tread portion. A belt structure or assembly can further be included between the tread portion and tire carcass. For example, a belt assembly can be positioned circumferentially about the radial outer surface of the tire carcass and beneath the tread. The belt assembly can provide lateral stiffness across the belt assembly width and reduce lifting of the tread portion from the road surface during rolling.

A first and a second bead portion are connected to the circumferential tread portion 100 through the first 103 and second sidewalls. Bead portions can be made from any materials generally known in the art to compose tire beads. In one embodiment, a tire bead may be composed from a stiff rubber compound and a reinforcing metal cable. In another embodiment, the reinforcing metal cable is made of steel. The tire beads may serve to attach the sidewalls, and thus the circumferential tread portion 100, to the vehicle by gripping to the tire rim 104. A portion of the tire rim 104 contacts each bead portion. Gripping of the tire beads to the tire rim may be enhanced when the tire is inflated with air.

As shown in FIG. 1, the tire can have one or more electrical conductive strips 105 are applied to outer surface of the tire. For example, each electrical conductive strip 105 extends over a portion of the outer surface of the tire from the first bead portion to the second bead portion. As FIG. 1 illustrates, each electrical conductive strip 105 continuously extends over a portion of the outer surface of the tire such that the outer surface of the first 103 and second sidewalls and the outer running tread surface 101 as well as the tread grooves 102 are in contact with each strip 105. In one or more embodiments, a portion of the tire rim 104 can be in contact with one or more of the electrical conductive strips.

In one embodiment, electrical resistivity of conductive and nonconductive materials is determined using a volume resistivity test. In another embodiment, electrical resistivity of conductive and nonconductive materials is determined using an ASTM D991 test.

In another embodiment, electrical resistivity of conductive and nonconductive materials may be determined using a test including a probe, a test fixture, a resistance/current meter, a thermo-hygrometer, and a thickness gauge capable of reading to 0.001 inches. A test sample of a conductive or nonconductive material may have dimensions of about 6.0 inches by 6.0 inches, by 0.1 inch. The test sample's thickness may be measured to the nearest 0.001 inch in two places, which may be about 2.0 inches from the test sample's edge, along a line bisecting the test sample. The test sample's edges referenced in the measurement of thickness may be adjacent to one another and approximately 90 degrees to one another. The test sample is laid on a table for at least 1.0 hour at room temperature prior to taking resistivity measurements. The test sample may be oriented in the test apparatus such that the test sample's edge is aligned with the edge of a conductive plate, which conductive plate is connected via a probe to the resistance meter, all of which is below the test sample. The remaining three sides of the test sample may hang over the edges of the conductive plate evenly. A second probe may be connected to an input of the resistance meter, and may be placed on the top of the test sample, such that it is approximately on center with the conductive plate oriented beneath the test sample. Following placement of the test sample and probes in the test fixture, electrical resistivity may be measured via the resistance meter. In one embodiment, the probe and test fixture are verified prior to testing a test sample's resistivity.

FIG. 2 illustrates an enhanced view of individual treads 200 on a portion of the tire tread 201 of a pneumatic tire. An individual tire tread 200 is composed of a ground-contacting surface 202, an inner-component contacting surface (not shown), at least one side surface 203, and a splice surface 204. A splice surface 204 may have a top edge 205 and a bottom edge 206. Likewise, the side surface 203 may also contain a radial top edge 207 and a radial bottom edge 208. The top edges 205, 207 and bottom edges 206, 208 of one individual tread and the top and bottom edges of another individual tread are separated by gaps called tire grooves 209, 210. As generally known in the art, tire grooves 209, 210 can have varying widths and depths.

The ground-contacting surface 202 of tire tread makes up the radially outermost portion of a tire when the tire tread is applied to the inner tire components and subjected to curing. In one embodiment, tire tread 201 includes a green tread that has not yet been cured. When a green tire is placed into a mold and cured, a pattern may be imparted to tire tread 201. Tire tread 201 pattern may be created by any variety of methods including, for example, extrusion, calendaring, and compression molding. The pattern may include at least one tread rib or tread block, and at least one tread groove 208, 209. Moreover, the individual tire treads containing the pattern may be of many shapes and designs generally known in the art. In another embodiment, tire tread 201 is a cured tread.

Upon application to tire inner components, the tire tread 201 is oriented about the outside circumference of the tire carcass and connected to itself at a splice. The splice surface may interface with a second corresponding splice surface when tire tread is oriented about the outside circumference of the tire carcass. As noted above, the tire tread portion can be arranged axially adjacent to a first sidewall 211 and a second sidewall 212 of the tire.

The pneumatic tire disclosed herein also contains one or more electrical conductive strips 213. In one embodiment, from 1 to 15 electrical conductive strips 213 can be present on the pneumatic tire. In another embodiment, from 1 to 10 electrical conductive strips 213 can be present on the pneumatic tire. In yet another embodiment, 2, 3, 4 or 5 electrical conductive strips 213 can be present on the pneumatic tire.

FIG. 1 illustrates one embodiment of the placement of multiple electrical conductive strips 105, 106 on a tire. When two or more electrical conductive strips are present on a pneumatic tire, a first electrical conductive strip 105 and the other electrical conductive strips 106 will be spaced apart 107 and will not be in contact with one another. Accordingly, each individual electrical conductive strip 105, 106 will not attach at the same first or second bead portion as another strip, will not be in contact with the same portion of the tire rim 104, and will not touch with another strip as it continuously extends over the outer surface of the tire. The size of the spacing between the electrical conductive strips 107 may vary depending on the number of strips applied and the size of the tire. In one embodiment, the electrical conductive strips can be arranged such that they are equally spaced around the circumference of the tire.

As demonstrated in FIG. 2, a cured electrical conductive strip 213 can possess an outermost surface and an innermost surface that is in direct contact with the tire. In one embodiment, the electrical conductive strip 213 can be applied to the tire such that the outermost surface of the strip 213 can form a portion of the outer surface of the first 211 and second 212 sidewalls of the tire after the tire and strip are cured. Additionally, the electrical conductive strip 213 can be applied to the tire such that the outermost surface can form a portion of the outer tread running surface 214 after the tire and strip have been cured. For example, the electrical conductive strip forms a ground-contacting surface in that is arranged as an overlay across a portion of the outer tread running surface 214.

In an uncured state, the electrical conductive strip 213 is a solid strip that has flexibility for being applied to a green tire. The strip 213 can be a gum strip that is flexible and the strip's flexibility eases the process of overlaying the strip on the outer surface of the tire, for example extending the strip across the tire and placing it on an outer surface of the tire, during the manufacturing process. The uncured, solid electrical conductive strip also desirably has a degree of tackiness that functions to adhere the strip to the outer surface of the tire during the manufacturing process. The electrical conductive strip 213 is not applied to the tire in the form of a solution or liquid mixture that can be sprayed or painted onto the tire. As used herein, the term gum indicates that the electrical conductive strip is a solid strip.

In one embodiment, the electrical conductive strip forms a section of the outermost surface of the tread 201 and overlays and is in direct contact with the ground-contacting surfaces 202 of the tread. In another embodiment, the electrical conductive strip extends continuously over and in direct contact with the ground-contacting surfaces 202 of the tread and the sides 203, 204 and the groove surfaces 208, 209. In yet another embodiment, the electrical conductive strip forms an outermost surface of a portion of the tread 201 from one shoulder area adjacent the tread of the tire to the opposite shoulder area adjacent the tread of the tire.

The tread overlay electrical conductive strip can wear with the tread surface during use such that a portion of the electrical conductive strip is present as a ground contacting surface during the normal use and wear of the tire. For example, the portion of the electrical conductive strip overlying the ground-contacting surfaces 202 of the tread can wear away and reveal the tread rubber 202 underneath. As the electrical conductive strip wears away from overlying surface 202, the portions of the strip covering the sides 203, 204 of surface 202 remain flush with surface 202 as the tread of the tire wears during use. The portions of the electrical conductive strip overlying the edge sections 203, 204 of the tread surface 202 would remain as a portion of the ground-contacting surface as the strip is worn off of surface 202. As the tire further wears, the portions of the strip overlying the edges 203, 204 remain flush with surface 202 (e.g., the strip can surround the ground-contacting tread 202) until the treads wear down to the groove bases 208, 209.

Each electrical conductive strip 213 is compounded from conductive materials such that the strip possesses a higher electrical conductivity relative to the electrical conductivity of the first 211 and second 212 sidewalls and the outer running surface 202 of the tire tread 201. Conductive materials are generally those materials possessing an electrical resistivity that permits discharge of built-up electricity in a vehicle at a rate sufficient to avoid negative effects of electricity build up in the vehicle. In one embodiment, conductive materials are those possessing an electrical resistivity of about $10^9 \Omega \cdot cm$ or less. In another embodiment, conductive materials are those that possess an electrical resistivity of about $10^6 \Omega \cdot cm$ or less. In another embodiment, conductive materials are those possessing an electrical resistivity of between about $10^5 \Omega \cdot cm$ and about $10^9 \Omega \cdot cm$. In another embodiment, conductive materials are materials possessing an electrical resistivity of between about $10^5 \Omega \cdot cm$ and about $10^8 \Omega \cdot cm$. In another embodiment, conductive materials are materials possessing an electrical resistivity of between about $10^5 \Omega \cdot cm$ and about $10^6 \Omega \cdot cm$.

In one embodiment, electrical conductive strip 213 can be composed of a conductive component or element chosen from carbon black, a rubber containing carbon black, a metallic element, or a rubber containing a metallic element. In another embodiment electrical conductive strip 213 can be composed of a rubber containing carbon black.

Carbon black can be present in an amount of about 20 to about 80 phr, or about 30 to about 70 phr, and preferably in an amount to result in an electrical resistivity lower than one or more tire components that the strip overlays (e.g, sidewalls). Various grades of carbon black can be used, for example, HAF, FEF or GPF grades.

In other embodiments, the carbon black additive can have a DBP absorption value of at least 250 ml/100 g and a BET surface area oft least 500 $m^2/g$. In another embodiment, the carbon black can have nitrogen absorption specific surface area ($N_2SA$) in the range of about 25 to about 100 $m^2/g$, or a $N_2SA$ of more than about 50, 60, 70, or 80 $m^2/g$. To lower the electrical resistivity of the electrical conductive strips to the desired range, the carbon black by used in combination with an ionic conductive material, for example, a lithium salt or metal material (e.g., nickel). Metal material can include metal powder, metal flake, metal oxides, and combinations thereof.

In an example, the electrical conductive strips can be formed by adjusting the amount of the electrical component (e.g., carbon black) to obtain the desired electric resistivity, for example, less than $10^7 \Omega \cdot cm$. In one embodiment, the electrical conductive strips can include one or more elastomers. Exemplary elastomers include, without limitation, natural rubber, styrenebutadiene rubber, polyisoprene, polyisobutylene, polybutadiene, isoprene-butadiene copolymer, neoprene, nitrile rubber, butyl rubber, polysulfide elastomer, acrylic elastomer, acrylonitrile elastomers, silicone rubber, polysiloxanes, polyester rubber, diisocyanate-linked condensation elastomer, ethylene propylene diene rubbers, chlorosulphonated polyethylene, fluorinated hydrocarbons, and combinations thereof. The terms elastomer and rubber are used interchangeably in this specification.

The electrical conductive strips of the present disclosure may further include, if desired, various appropriate additional compounding ingredients as known in the art, e.g., oils, pigments, extenders, surfactants, stabilizers, softeners (e.g., wax, stearic acid, zinc), resins (adhesives), vulcanizing agents (e.g., sulfur) and anti-oxidants. In another example, non-carbon black reinforcing agent such as silica, clay or calcium carbonate may be used in an appropriate amount in combination with carbon black.

In one embodiment, the electrical conductive strip is made up of an electrical conductive strip composition. The electrical conductive strip composition can include one or more electrical components. In one or more embodiments, the electrical conductive strip composition contains an electrical component as described herein. The electrical component of the electrical conductive strip composition can be the same type of electrical component present in a tire component that the strip overlies. For example, the electrical component of the electrical conductive strip composition can be the same type of electrical component present in the tread composition that makes up the outer surface of the tread portion of the tire. Preferably, the amount of the electrical component, or total amount of multiple electrical components present in the in the electrical conductive strip composition is greater than the amount of the electrical component or mixture of electrical components present in a tire component that contacts and directly underlies the electrical conductive strip.

In one or more embodiments, the electrical conductive strip composition can be the same as the composition of an underlying tire component composition except that the concentration of the one or more electrical components in the electrical conductive strip composition is greater than the concentration of the total amount of electrical components in each respective tire component composition in contact with the strip. For example, the electrical conductive strip composition can have the same components or ingredients as present in the tread composition that forms the outer surface of the tread portion (e.g., the running surface or ground contact surface). In another example, the total amount or concentration of electrical components in the electrical conductive strip composition is at least 10, 20, 30, 40, 50, 60, 70, 80 or 90 percent greater in amount or concentration as compared to the amount or concentration of the total amount or concentration of electrical components in a tire component composition in contact with the strip (e.g., the one or more electrical components in the strip composition can be the same type of electrical components present in an underlying tire component composition such as the tread composition). In this regard, a portion of a composition that is formed for any of the tire components that contact the electrical conductive strip can be used for forming the strip composition. The strip composition can be adjusted with additional electrical component to increase the conductivity of the strip composition to the desired level.

The electrical conductive strip can be made by calendaring sheets of uncured material and forming strips of material from the sheets. In another example, the electrical conductive strips can be formed by extruding material in the desired strip dimensions and shape, for instance, with the use of a die plate on the discharge of an extrusion apparatus. The solid, flexible electrical conductive gum strips can be overlaid onto the tire as described below.

The dimensions of the electrical conductive strips may be adjusted to accommodate pneumatic tires of various sizes, shapes, and thicknesses. For example, the width of the strip may be selected to accommodate a vehicle, such as a semi-trailer truck, which may require a larger tire. Accordingly, in one embodiment the electrical conductive strip 213 may have a width of about 0.1 inch to about 6 inches. In another embodiment, the electrical conductive strip 213 may have a width of about 0.25 inch to about 4.5 inches. In yet another embodiment, the electrical conductive strip 213 may have a width of about 0.5 inch to about 3 inches.

Similarly, the width of the electrical conductive strips may be adjusted for application in tires used for heavy or strenuous driving resulting in excessive tire wear. In one embodiment, the electrical conductive strip 213 may be of a thickness of about 0.25 inch or less. In another embodiment, an electrical conductive strip 213 may be of a thickness of about 0.20 inch or less. In yet another embodiment, electrical conductive strip 213 may be of a thickness of about 0.15 inch or less. In yet another embodiment, electrical conductive strip 213 can have a thickness of less than about 0.1 inch.

The pneumatic tire disclosed herein results from a method that includes the curing of a green, or uncured, tire after the electrical conductive strips are applied. Thus, any molding steps that are carried out during the curing process, for example molding a tread or sidewall surface design or pattern, are likewise carried out on the strip applied on the outer surface of the green tire. Generally, a green tire may be formed by any number of processes currently known in the art. For example, one process of constructing a green tire may involve using a machine to assemble steel belts, beads, ply, sidewalls, and tread from the inside out.

Similarly, a green tire may be cured by any number of processes as known in the art. In one embodiment, a green tire is pressed into a heated mold while an internal bladder inflates to push against the mold from the inside. Competing forces acting on the green tire results in a tire having a tread pattern. Moreover, the heated mold serves to vulcanize the rubber and may preserve the pattern and the tire's final shape. After the unvulcanized pneumatic tire including the one or more electrical conductive strips is assembled, the tire and its components can be vulcanized and molded using a normal tire cure cycle, which can include a range of temperatures. In an example, a tire (e.g., a passenger tire) can be cured at a temperature in the range of 130° C. to 170° C. The tire can be cured for a period of time as conventional in the art, for example, in a range of 10 to 30 minutes, or, in another example, 45 minutes or more. The length of the cure period can be dependent on the tire size and degree of desired depolymerization of the rubber contained therein. The cure period can also be affected by the thickness of the component layers themselves (e.g., the sealant material).

In another embodiment, the tread pattern is made through the above process on a separate strip of rubber and is then applied to the green tire. The green tire and the attached tire tread are subsequently vulcanized. In either embodiment, the heat of vulcanization can be supplied, for example, through electricity or high-pressure steam.

Each electrical conductive strip 213 of the pneumatic tire is uncured before application to the tire. Moreover, each electrical conductive strip 213 may be applied independently from other electrical conductive strips. In one embodiment, two or more electrical conductive strips 213 can be applied to an uncured tire. The uncured tire is vulcanized after at least two electrical strips 213 have been applied to produce a pneumatic tire. In another embodiment, at least two electrical conductive strips 213 can be placed on a semi-cured tired. The semi-cured tire undergoes a second curing process after at least two electrical conductive strips 213 have been applied to produce a pneumatic tire.

To apply the electrical conductive strips 213, each uncured strip is overlaid on an outer-facing surface of the uncured tire tread pattern 201. Each overlaid strip extends continuously around the circumference of the uncured tire from a first bead to a second bead, such that the strip is in contact with the sidewalls 211, a rim portion 215, and the outer running tread portion 214. In one embodiment, the electrical conductive strip 213 is arranged over a portion of the circumferential tread pattern 201 in a direction that is perpendicular to the circumferential direction of the tread pattern.

In one embodiment, each uncured electrical conductive strip 213 is contoured with and in contact with the individual treads 200 and the grooves of a portion of the tire tread pattern 214 on which it is overlaid. The tire is then cured to ensure that the electrical conductive strip 213 permanently adheres to the individual treads 200 and grooves 209, 210 of the tire. Each cured electrical conductive strip remains in contact with a first bead, a second bead, and a tire rim portion 215 of the tire. After curing, the electrical conductive strip 213 and the outer-facing portion of the tread to which it adheres form a ground-contacting surface 214. The ground-contacting surface 214 will interact with the ground as the tire rotates during vehicle operation. Thus, each electrical conductive strip 213 serves as a static electricity conductive path from the tire rim to a ground-contacting surface of the pneumatic tire.

Figure 3:
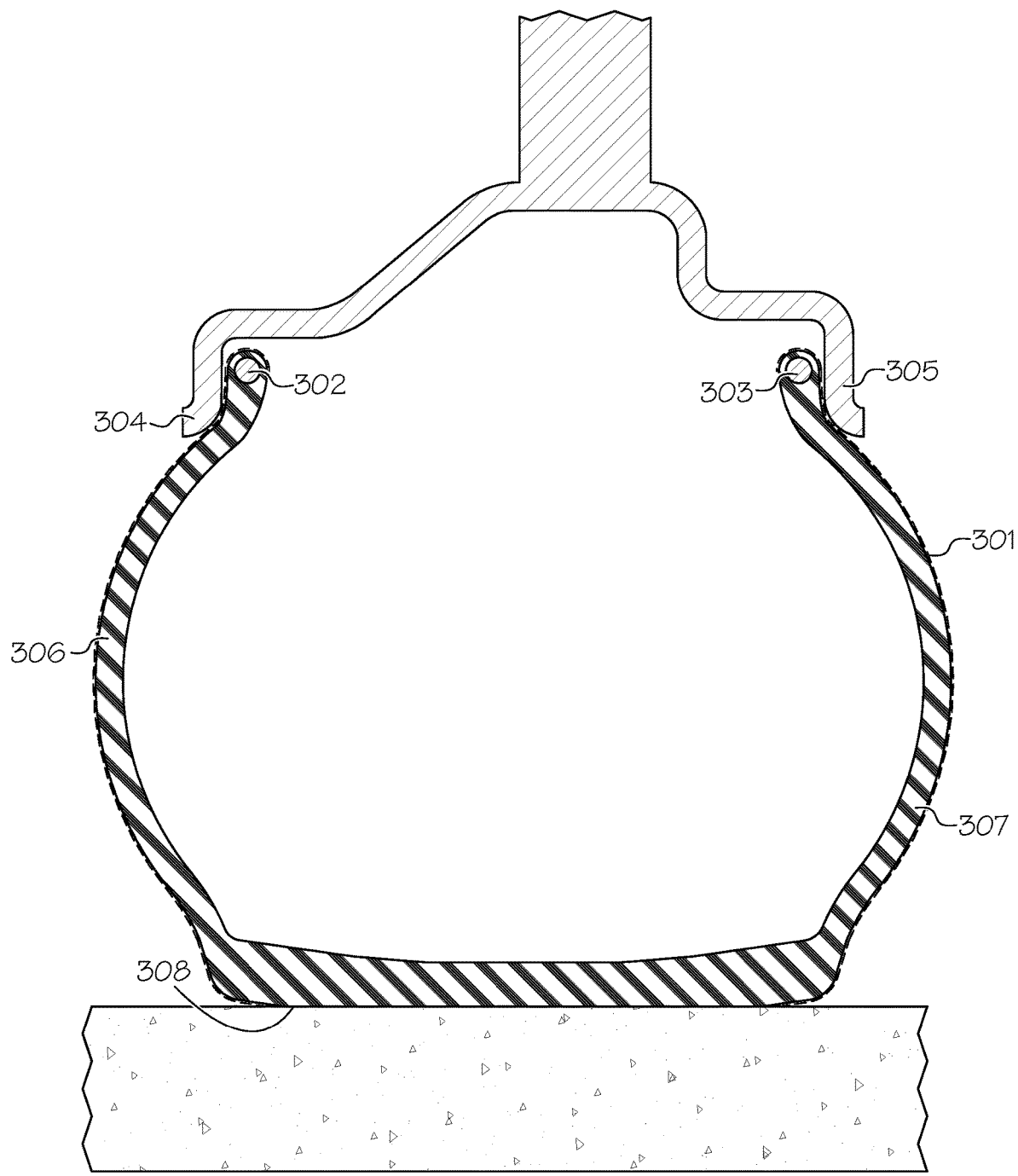
FIG. 3 shows a cross-sectional view of a pneumatic tire described herein.

As illustrated in FIG. 3, a cross sectional view of the pneumatic tire disclosed herein, the electrical conductive strip 301, identified by a dotted line, is applied to the cured tire such that it continuously extends from a first bead 302 to a second bead 303. Through such an application, an exterior-facing portion of the tire rim 304 and an interior-facing portion of the tire rim 305 contacts the electrical conductive strip 301. One sidewall of the tire 306 and a second sidewall of the tire 307 are also covered by the electrical conductive strip 301. The ground-contacting portion of the tire 308 is formed from curing the tread portion of the tire to the overlaid electrical conductive strip 301.

As the tire rotates, static electricity may travel down from the vehicle to the tire rim 304, 305. The charge can then be transferred from the tire rim 304, 305 to the electrical conductive strip 301 at the point of contact. The electric charge can then travel along the electrical conductive strip 301, which forms a conductive path, down the sidewall 306 to the ground-contacting portion of the tire. Electricity may be discharged from the vehicle once the ground-contacting portion of the tire 308 interacts with the ground during vehicle operation.

Figure 4:
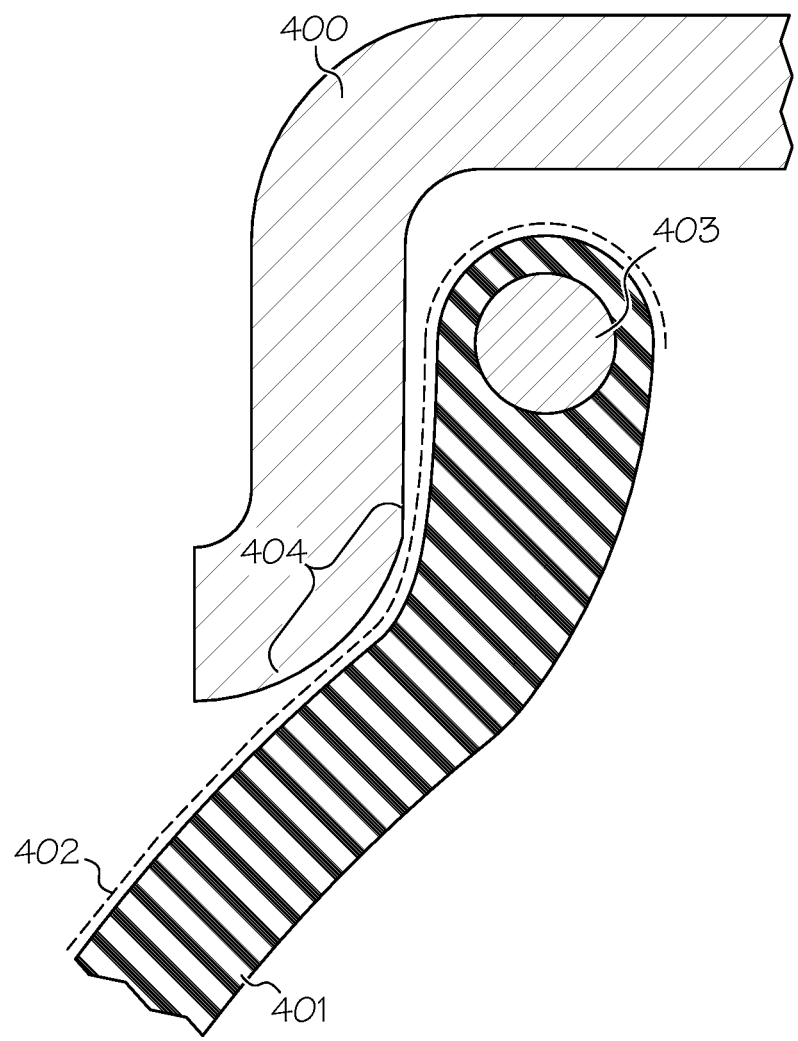
FIG. 4 shows an enhanced cross-sectional view of the tire-rim portion of a pneumatic tire described herein.

FIG. 4 depicts a close up of the cross-sectional view of the tire rim 400 on a pneumatic tire disclosed herein. As illustrated, an outer-facing sidewall of a tire 401 has been covered by an electrical conductive strip 402. The electrical conductive strip 402 contacts a bead portion 403 of the tire. In one embodiment, the electrical conductive strip 402 completely envelops the bead portion 403 of the tire. In another embodiment, the electrical conductive strip 402 envelops only part of the bead portion 403 of the tire. The covered sidewall 401 descends from the bead portion 403 of the tire and passes around tire rim 400. At one point, the strip-covered sidewall 401 touches the rim 404. Static electricity transferred to the tire rim 400 from the vehicle may be further assigned to the electrical conductive strip 402 at this point of contact 404. The electric charge may then proceed down the outer-facing sidewall 401 towards the ground by following the conductive path provided by the electrical conductive strip 402.

All references, including but not limited to patents, patent applications, and non-patent literature are hereby incorporated by reference herein in their entirety.

While various aspects and embodiments of the compositions and methods have been disclosed herein, other aspects and embodiments will be apparent to those skilled in the art. The various aspects and embodiments disclosed herein are for purposes of illustration and are not intended to be limiting, with the true scope and spirit being indicated by the claims.

What is claimed:

1. A pneumatic tire comprising:
   a circumferential tread portion comprising an outer tread running surface comprising tread grooves;
   a first sidewall and a second sidewall, the first and second sidewalls arranged axially adjacent to the tread portion, the first and second sidewalls comprising an outer surface facing away from a carcass portion;
   a first bead portion and a second bead portion, the first and second bead portions being connected with the tread portion by the first and second sidewalls and the first and second bead portions comprising a rim contact portion;
   a rubber electrical conductive strip that continuously extends around an outer surface of the pneumatic tire from the first bead portion to the second bead portion, the rubber electrical conductive strip being in contact with the outer surface of the first and second sidewalls, the rim contact portion of the first and second bead portions and the outer tread running surface of the tread portion, the rubber electrical conductive strip comprising a width in the range of 0.25 to 4.5 inches and a thickness of 0.1 to 0.25 inch.

2. The pneumatic tire of claim 1, the rubber electrical conductive strip being contoured with and in contact with a portion of the tread grooves of the tread portion.

3. The pneumatic tire of claim 1, the rubber electrical conductive strip being in contact with a tire rim, wherein the rubber electrical conductive strip is positioned between the tire rim and the first bead portion and the second bead portion.

4. The pneumatic tire of claim 3, the rubber electrical conductive strip being a static electricity conductive path from the tire rim to a ground-contacting surface of the pneumatic tire.

5. The pneumatic tire of claim 1, further comprising two or more rubber electrical conductive strips, each of the two or more rubber electrical conductive strips continuously extending from the first bead portion to the second bead portion, the two or more rubber electrical conductive strips being spaced apart and not in contact with one another.

6. The pneumatic tire of claim 1, the tread grooves forming a tread pattern and the rubber electrical conductive strip overlying a portion of the tread pattern, the rubber electrical conductive strip being contoured with and in contact with the portion of the tread pattern.

7. The pneumatic tire of claim 1, the rubber electrical conductive strip having a higher electrical conductivity relative to the electrical conductivity of the first and second sidewalls and the outer tread running surface of the tread portion.

8. The pneumatic tire of claim 1, the rubber electrical conductive strip overlying the outer tread running surface to form a ground-contacting surface.

9. The pneumatic tire of claim 8, the ground-contacting surface of the rubber_electrical conductive strip being in direct contact with a ground surface.

10. The pneumatic tire of claim 1, the rubber electrical conductive strip comprising an electrical conductive strip composition comprising electrical conductive strip components and the outer tread running surface of the tread portion comprising a tread composition comprising tread composition components, wherein the electrical conductive strip components are the same as the tread composition components.

11. The pneumatic tire of claim 10, the rubber electrical conductive strip components comprising a conductive component and the tread composition comprising the conductive component, wherein the amount of the conductive component in the electrical conductive strip composition is greater than the amount of the conductive component in the tread composition.

12. The pneumatic tire of claim 1, the rubber electrical conductive strip comprising a width in the range of 0.5 to 3 inches.

13. The pneumatic tire of claim 1, the rubber electrical conductive strip having an outermost surface, the outermost surface of the rubber electrical conductive strip forming a portion of the outer surface of the first and second sidewalls and a portion of the outer tread running surface.

\* \* \* \* \*